June 29, 1965    I. V. STROGANOV ETAL    3,191,589
ULTRASONIC MACHINE FOR MAKING AND POLISHING HOLES IN BLANKS
AND PARTS OF CARBIDES AND MINERALS, MAINLY
DIAMONDS, BY THE SLOTTING METHOD Filed July 11, 1962      3 Sheets-Sheet 1

INVENTORS
I. V. STROGANOV
A. N. MAYOROV

BY
ATTORNEYS

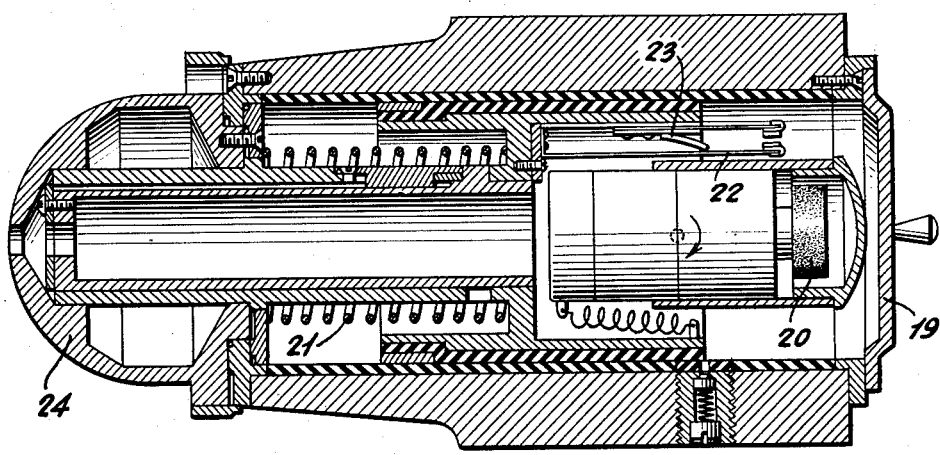
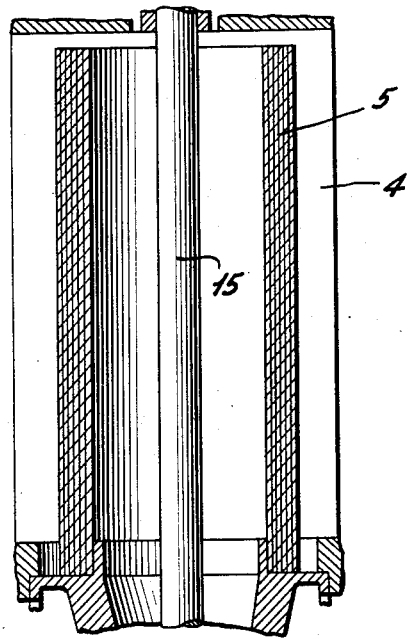

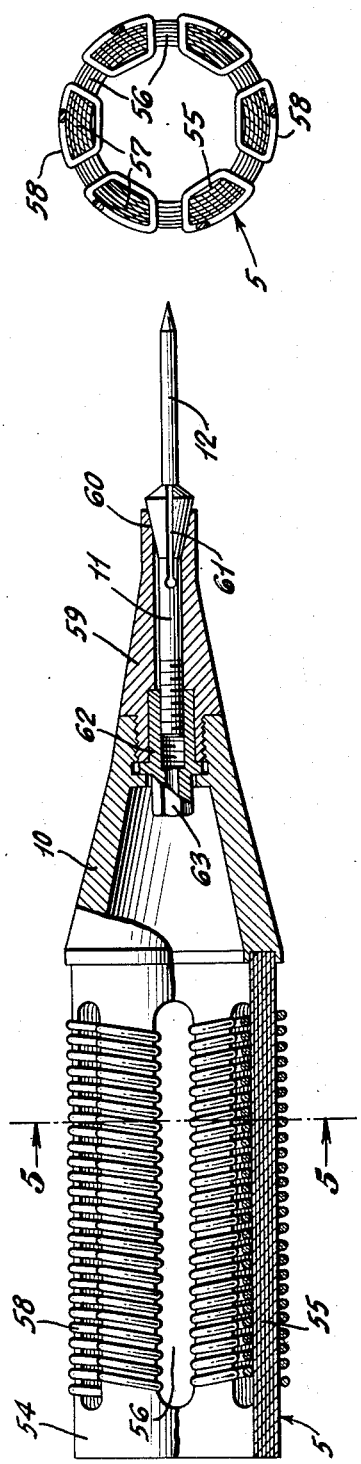

United States Patent Office 3,191,589
Patented June 29, 1965

3,191,589
ULTRASONIC MACHINE FOR MAKING AND POLISHING HOLES IN BLANKS AND PARTS OF CARBIDES AND MINERALS, MAINLY DIAMONDS, BY THE SLOTTING METHOD
Ivan Vasilievich Stroganov, 16th Parkovaia Ulitza, Ia, Apt. 1, and Anatoly Nicolaevich Mayorov, Kotelnicheskaia Naberejnaia 17, Apt. 24, both of Moscow, U.S.S.R.
Filed July 11, 1962, Ser. No. 209,089
5 Claims. (Cl. 125—30)

This invention relates to an ultrasonic machine for making and polishing holes in blanks and parts of carbides and mineral, mainly diamonds, by the slotting method. The present invention refers to the processing of carbides and minerals with ultrasonic frequency oscillations or, more exactly, to ultrasonic machines for making holes in blanks and parts and for polishing the walls of these holes, using the slotting method.

It is well known that if a slotting tool, particularly a needle-shaped tool is oscillated at an ultrasonic frequency, this tool can be used for processing of blanks and parts of carbides and minerals, for example, diamonds.

The main drawback of the hitherto known types of ultrasonic machines for making and polishing holes in blanks and parts of carbides and minerals by the slotting method with the aid of an ultrasonic tool is that they do not allow high accuracy of processing to be obtained, when the diameter of holes to be slotted should not exceed 0.05 mm., since owing to the necessity of cooling the transducer, its movement cannot be limited by guiding devices which prevent normal, ventilation of the transducer elements.

The other shortcomings of the known types of ultrasonic machines are excessive consumption of abrasive slurry and slow rate of processing.

Many attempts have been made to overcome the above-mentioned drawbacks of ultrasonic machines, however, to the best of our knowledge, none of these attempts were successful in engineering practice.

The newly-suggested ultrasonic machine is free of the shortcomings inherent in the existing types of these machines.

The major unit of the newly suggested machine is the ultrasonic magnetostrictive transducer, which imparts ultrasonic oscillations to the cutting tool, having the shape of a hollow cylinder made up of metal (nickel) strip coils, the latter being interlaid with paper spacers. The tool is provided with longitudinal slits (openings) to allow circulation of the transducer cooling air, and rests freely on the machine housing by means of a support bushing attached to it.

The main purpose of the present invention is to build a machine which will allow high-precision processing and reduce the consumption of abrasive slurry during the machine operation.

A further important consideration is the increase of processing speed provided by the machine of this invention.

The other advantages of the machine will be seen from the following description and the drawings attached to it.

FIG. 1 presents a longitudinal vertical sectional drawing of the newly suggested machine.

FIG. 2 shows the ultrasonic magnetostrictive transducer of the machine drawn to a large scale.

The drawing of the tool grinding device, made to a large scale, is given in FIG. 3.

FIG. 4 is a view in elevation to an enlarged scale with parts broken away and in section for greater clarity and showing the specific structure of the transducer;

FIG. 5 is a sectional view taken substantially on the line 5—5 of FIG. 4;

FIG. 6 is a longitudinal sectional view to an enlarged scale showing the structure of the abrasive slurry-receiving bowl and with the major portion of the slurry in the outer chamber;

FIG. 7 is a longitudinal sectional view similar to FIG. 6, and showing the major portion of the abrasive slurry in the inner chamber.

Figure 1:
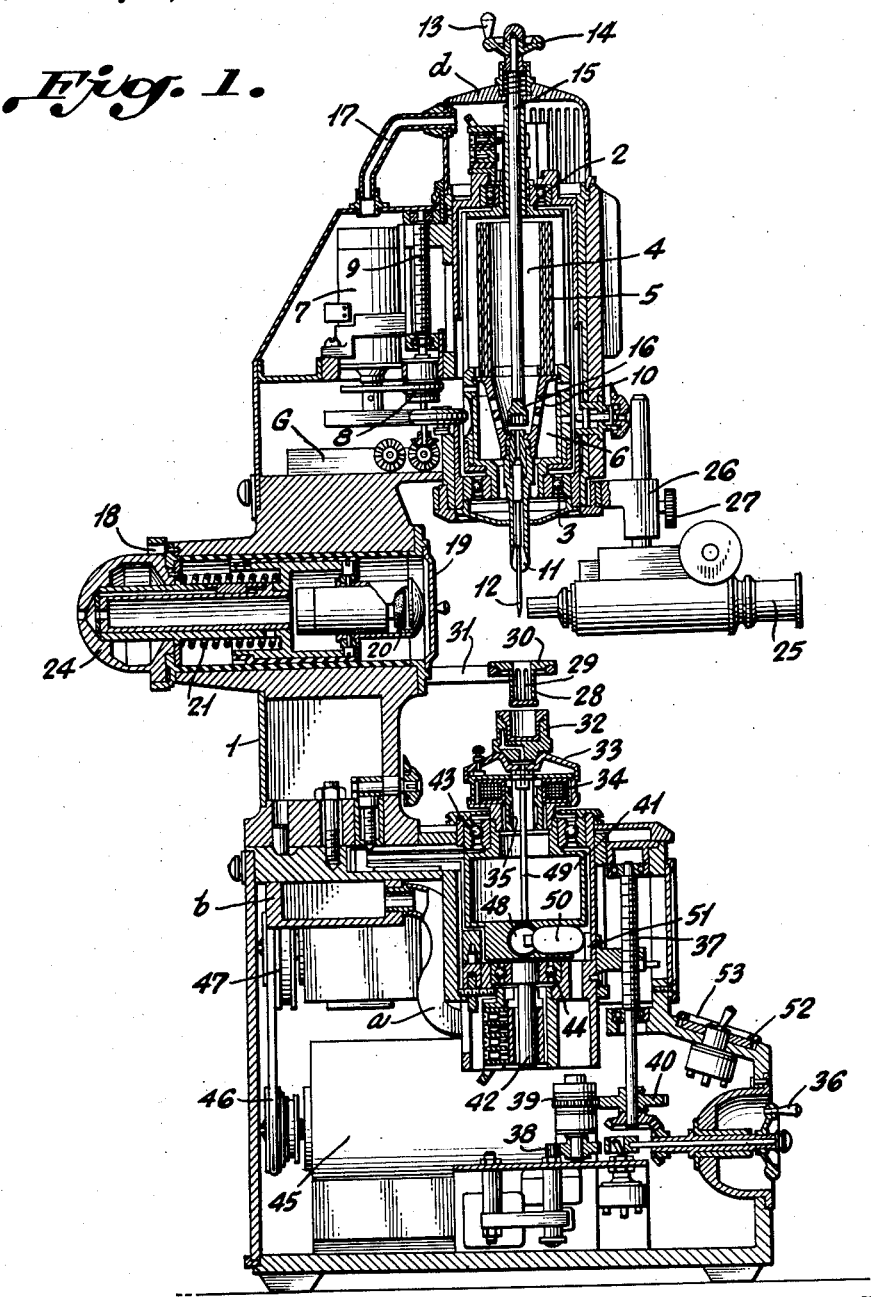

Bearings 2 and 3 mounted in the upper part of column 1 accommodate chamber 4 which holds the magnetostrictive projector (transducer) 5. The magnetostrictive transducer 5 is properly centered and freely rests on the walls of the chamber also by means of sleeve 6 attached to it.

Electric motor 7 is connected through drive 8 to screw 9 which sets the transducer with the tool in the upper (idle) or the lower (working) position. Electric motor 7 is simultaneously used for rotating the tool.

The specific structure of the transducer and tool receiving collet chuck is shown in FIGS. 4 and 5, and as seen from these figures, the transducer 5 comprises an elongated cylindrical member 54 which is formed by coiling a single strip of metal, preferably nickel, with layers of insulating paper between the layers to provide laminations, such laminations being indicated at 55 in FIG. 4. A plurality of circumferentially spaced, longitudinally extending slots 56 are provided in the cylindrical member 54, and the portions 57 between the slots 56 provide cores. A coil 58 is wound on each core 57, and the slots 56 also provide for efficient circulation of air for the purpose of cooling the transducer.

The cylindrical member 54 is secured at one end to a cone 10 which in turn is secured to a cone 59, which is provided with an outwardly tapering bore 60. Received in the tapered bore 60 is a collet chuck 11 provided with slots 61 for imparting resiliency thereto and providing gripping jaws. The nut 62 is rotatably mounted in the cone 59 at the inner end thereof, and the nut 62 threadedly engages the shank of the collet chuck 51. Also provided on the nut 62 is a wrench-engaging portion 63 which may be engaged by the socket 16 to rotate the nut 62 and move the collet chuck 11 in the tapered bore 60 to grip or release a needle-shaped tool 12.

As shown in FIG. 1, conduit 17 is provided for receiving a cable to supply electric current to the coils 58 of the transducer 5.

FIG. 1 shows the magnetostrictive transducer, with the needle-shaped tool 12 in the upper position.

The slotting of holes in the blank with the aid of the needle-shaped tool 12 can also be accomplished without rotating the tool (needle), for which purpose electric motor 7 may be provided with a standard device which makes it possible to de-energize the motor with the needle in the lower position.

When the transducer unit is in the upper position (as shown in FIG. 1), tool 12 can be ground by means of a special grinding device marked by reference number 18 in FIG. 1 and shown separately in FIG. 3.

For grinding the tool 12 (the latter being rotated), cover 19 of the tool grinding device should be opened (manually), and grinding wheel 20 of the device will be automatically fed to tool 12 by means of spring 21.

The rotation time of grinding wheel 20 and the time of tool grinding can be adjusted by bi-metallic strip 22 with heater 23 and set with the aid of a potentiometer (not shown in the drawing).

On finishing the tool grinding cycle, grinding wheel 20 is withdrawn (manually) and cover 19 closed.

The required tool grinding angles are set by changing the tilt of grinding wheel 20 relative to tool 12, by turning the rear-semi-spherical knob 24 one way or the other.

Visual control of the tool 12 grinding process is effected by means of optical device 25 (see FIG. 1) which is secured on column 1 by means of block 26 with adjusting screw 27.

The blank to be processed (not shown in the drawing), for example a diamond, must be fastened on the machine in line with tool 12. For this purpose, the machine design provides for a cylindrical bowl 28 with slots 29, made in its cylindrical wall to facilitate observation of the blank position, and a groove cut in the bottom. The bowl has a flange 30 by which it rests freely on the annular slot of its supporting bracket 31.

The blank is placed in the groove and is glued to the bottom of bowl 28. With bath 32 in the upper (working) position, bowl 28 enters the bath, rests on its bottom, simultaneously clearing bracket 31. Since the diameter of bowl 28 is somewhat less than the diameter of bath 32, the bowl 28 is free to move within certain limits on the bath bottom during the blank processing cycle, thereby ensuring self-centering of the blank.

Bath 32 is secured on table 33 which is connected with core 35 of electromagnet 34 and is attached to its core 35. With rated frequency current applied to the coil of electromagnet 34, core 35 is pulled into the coil, lifts table 33 with bath 32 and the blank placed in it towards tool 12. In so doing the whole table system reciprocates up and down with a frequency equal to the frequency of the current fed to the coil of electromagnet 34. As a result, gaps will be formed periodically between the end of tool 12 and the blank to receive the abrasive slurry from bath 32, thereby speeding up the processing cycle. Bath 28 with the blank and the whole table system can be lowered and raised manually (to advance the blank to tool 12), by rotating handwheel 36 and screw 37, or automatically through drive 37–38–39–40 during the whole slotting cycle.

With specific reference to FIGS. 6 and 7, there is shown the detailed structure of the bowl 32 for receiving the abrasive slurry, and such bowl comprises an outer wall 64, a bottom wall 65, and a top wall 66. A partition 67 depends from the top wall 66, and terminates in spaced relation to the bottom wall 65, the partition 67 serving to provide an outer annular chamber 68 and an inner chamber 69. It is to be noted that the outer chamber 68 is closed, while the inner chamber 69 opens upwardly. A passage 70 is provided in the outer wall 64 which communicates with the upper end of the outer chamber 68, and with a fitting 71 on the bottom wall 65, which fitting 71 is connected to the flexible hose or conduit 49.

The passage 70 is utilized to facilitate forcing air into the upper portion of the outer chamber 68 to force the abrasive slurry 72 therein from the outer chamber 68 into the inner chamber 69, as shown in FIG. 7, and upon withdrawal of air from the outer chamber 68 the abrasive slurry will flow back from the inner chamber 69 into the outer chamber 68. The means for supplying air to the outer chamber 68 and withdrawing the same will be later described.

Automatic feed is designed to feed the blank to tool 12 at a rate ensuring optimum processing of the blank.

The table system 32–33–34–35 is mounted in bearings 43, 44, by means of body 41, 42, and is rotated by electric motor 45 through drive 46, 47.

The shaft of electric motor 45 mounts an air turbine. The air flows out of the turbine chamber, along pipe $a$, to air distributor $b$, whence part of the air is used for cooling the oscillator valves and the rest passes along the ducts made in the machine head (not shown in FIG. 1) into chamber 4, through slot $c$ and the slots made in the walls of this chamber.

The air used for cooling the magnetostrictive transducer flows out through the slots cut in upper cap $d$ of the machine head.

To reduce the consumption of abrasive slurry, the latter is imparted pulsating motion by means of a pneumatic device.

The pneumatic device used for imparting pulsating motion to the abrasive slurry in bath 32 consists of bottle 48 made of an elastic and resilient material, for example rubber, and of flexible hose 49, connected with the annular recess in the wall of bath 32 which communicates with the recess of the bath lower section.

As the table system rotates, plunger 50 slides along the inner surface of fixed circular cam 51 and reciprocates intermittently in the radial direction and periodically (once per one complete turn of the table system) compresses bottle 48. The reverse motion of plunger 50 is accomplished due to the elasticity of the walls of bottle 48.

With bottle 48 compressed, air is forced out of the bottle into the annular recess of bath 32 and presses the abrasive slurry out of the bath recess into the bath, without entering the bath. When bottle 48 is released, air will return from the bath recess back into the bottle and will be replaced in the recess by the abrasive slurry from bath 32. In this case the slurry should not get into flexible hose 49.

Slant panel 52 provided on column 1 is designed to mount devices 53 which control the electric motors and the other elements of the machine.

The polishing of holes made in the blank takes place at an increased speed of table and tool rotation in opposite directions, using fine grain abrasive slurry.

It will be obvious to those skilled in the art that various changes may be made in the invention without departing from the spirit and scope thereof, and therefore, the invention is not limited by that which is shown in the drawings and described in the specification, but only as indicated in the appended claims.

What we claim is:

1. An apparatus for machining by ultrasonic oscillation of a tool, said apparatus comprising a base, an overhanging arm on said base, a magnetostrictive transducer mounted on said arm for vertical and rotary movement, power means for raising and lowering and for rotating said transducer, a tool chuck on the lower end of said transducer, a needle-shaped tool carried by said chuck, a table rotatably mounted on said base below said tool, a bowl mounted on said table for containing an abrasive slurry and for receiving and supporting an article to be machined, electro-magnetic means for imparting vertical vibrations to said table and bowl, said bowl having communicating inner and outer chambers and means to periodically transfer abrasive slurry from the outer chamber to the inner chamber and back to the outer chamber.

2. An apparatus as defined in claim 1, in which said table and bowl are mounted for vertical movement, and means to move said table and bowl vertically toward and away from said tool.

3. An apparatus as defined in claim 1, in which said transducer comprises an elongated cylindrical member, said member comprising a single coiled strip of nickel with insulating paper between the layers to provide laminations, a plurality of circumferentially spaced longitudinally extending slots in said member, the portions of said member between said slots providing cores and a coil wound on each core, said slots also providing for the circulation of cooling air around said coils.

4. An apparatus as defined in claim 1, in which said bowl comprises an outer wall, a bottom wall, a top wall, an annular partition depending from said top wall and terminating in spaced relation to said bottom wall, said top wall closing the space between said partition and said outer wall to provide said outer chamber, the space within said partition providing said inner chamber and opening upwardly and means for forcing air into said outer chamber to force abrasive slurry from said outer chamber into said inner chamber and for withdrawing air to permit said slurry to flow back from said inner chamber into said outer chamber.

5. An apparatus as defined in claim 4, in which said means for forcing air into said outer chamber and withdrawing the same therefrom comprises a closed bottle mounted on said table and having flexible elastic walls, a conduit connecting said bottle and said outer chamber, a plunger slidably mounted on said table and engaging a wall of said bottle and a fixed cam on said base in the path of movement of said plunger, whereby upon rotation of said table said cam will periodically move said plunger to partially collapse said bottle and force air therefrom, retraction of said plunger permitting said bottle to resume normal shape thereby withdrawing air from said outer chamber.

References Cited by the Examiner

UNITED STATES PATENTS

| | | |
|---|---|---|
| 2,398,251 | 4/46 | Robbins _____ 125—30 |
| 2,434,285 | 1/48 | Peek. |
| 2,452,211 | 10/48 | Rosenthal. |
| 2,457,644 | 12/48 | Crossman et al. |
| 2,580,716 | 1/52 | Balamuth. |
| 2,736,148 | 2/56 | Thatcher. |
| 2,848,672 | 8/58 | Harris _____ 310—26 X |
| 3,007,063 | 10/61 | Harris. |
| 3,015,914 | 1/62 | Roney. |

LESTER M. SWINGLE, *Primary Examiner.*

FRANK E. BAILEY, *Examiner.*